(12) United States Patent
Morisada

(10) Patent No.: US 6,721,486 B1
(45) Date of Patent: Apr. 13, 2004

(54) AUTOMATIC TIME SETTING APPARATUS AND METHOD FOR ELECTRIC DEVICE

(75) Inventor: Katsuhiro Morisada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/368,741

(22) Filed: Aug. 8, 1999

(30) Foreign Application Priority Data

Aug. 6, 1998 (JP) ............................ 10-005954

(51) Int. Cl.[7] .................................. H04N 5/76
(52) U.S. Cl. ...................... 386/46; 386/83; 386/95
(58) Field of Search ................... 386/1, 46, 95, 386/83, 94; 348/460, 461, 465, 467, 468, 473, 474, 476, 477, 478, 479; H04N 5/76, 9/79, 7/00, 7/08

(56) References Cited

U.S. PATENT DOCUMENTS

| | | | | |
|---|---|---|---|---|
| 5,134,496 A | * | 7/1992 | Schwab et al. | 386/94 |
| 5,592,300 A | * | 1/1997 | Huh | 386/46 |
| 5,668,915 A | * | 9/1997 | Baik et al. | 386/46 |
| 5,802,244 A | * | 9/1998 | Kinebuchi | 386/83 |
| 5,819,002 A | * | 10/1998 | Shim | 386/83 |
| 6,341,195 B1 | * | 1/2002 | Mankovitz et al. | 386/83 |

FOREIGN PATENT DOCUMENTS

| | | |
|---|---|---|
| JP | 5-176035 | 7/1993 |
| JP | 5-249256 | 9/1993 |
| JP | 8-201546 | 8/1996 |

* cited by examiner

*Primary Examiner*—Thai Tran
(74) *Attorney, Agent, or Firm*—Myron Greenspan, Esq.; Lackenbach Siegel LLP

(57) ABSTRACT

An automatic time setting apparatus for an electronic device which receives transmission radio wave in which time data is inserted, extracts the time data from the received transmission radio wave and performs a time setting operation of a clock section within the electronic device in accordance with the extracted time data. The automatic time setting apparatus includes a measuring section which starts measuring a constant time period in response to first turning-on of a power source, in which a system controller determines whether or not a first time setting operation of the clock section has been performed when the measuring section has measured the constant time period, and executes the time setting operation when it is determined that the first time setting operation has not been performed yet.

11 Claims, 3 Drawing Sheets

AUTOMATIC TIME SETTING APPARATUS AND METHOD FOR ELECTRIC DEVICE

BACKGROUND OF THE INVENTION

This application claims foreign priority from JP 10-005954, filed Aug. 6, 1998.

1. Field of the Invention

The present invention relates to an automatic time setting apparatus for an electronic device which receives transmission radio wave in which time data is inserted, extracts the time data from the received transmission radio wave and performs time setting operation of a clock means within the electronic device in accordance with the extracted time data, and also to an automatic time setting method.

2. Description of the Related Art

Recently, many electronic devices contain therein clock functions. This clock function serves to perform, for example, the setting operation of the current time in accordance with the initial setting menu which is displayed when a user who bought the electronic device inserts a plug thereof into a socket and turns on a power switch.

For example, in a television receiver (TV), a video cassette recorder (VCR) containing a tuner or the like, the automatic presetting of the receiving channels is performed and then the time setting of the clock function is performed succeeding to the automatic presetting. In Europe, there is a broadcasting station which transmits a television signal in which time data is inserted at synchronizing signal portions of vertical blanking intervals thereof, and the time data contained in such a television signal is extracted and the time setting of the clock function within the TV or the like is performed in accordance with the extracted time data.

That is, after the automatic presetting is performed thereby to automatically set the receiving channels, a selection menu for selecting whether the time setting (automatic clock setting) operation is to be performed automatically or manually is displayed on a television screen or a display panel of the VCR or the like. When a user selects the automatic time setting operation, then another selection menu is displayed for selecting whether a channel from which the time data is obtained is to be retrieved automatically or manually. When the user selects the automatic channel retrieval, hereinafter, the broadcasting station transmitting the television signal in which the time data is inserted is retrieved from the broadcasting stations set at the respective channels, then the time data contained in the television signal transmitted from the broadcasting station thus retrieved is extracted, and then the time setting operation of the clock function is performed.

In this manner, conventionally there have been proposed various types of automatic time setting apparatuses in each of which the automatic or manual operation can be selected from the selection menus displayed on the television screen or the display panel, and the time setting operation can be performed automatically by selecting the automatic operation. For example, a clock with radio correction function is disclosed in Japanese Patent Unexamined Publication No. Hei. 8-201546 as an automatic time setting apparatus for performing the time setting (automatic correction) of the clock function by the user's button operation.

In this manner, conventionally there have been proposed various types of automatic time setting apparatuses in each of which the time setting operation is performed automatically. However, in each of these automatic time setting apparatuses, a user is required to select whether the time setting operation is to be performed automatically or manually and to select whether the retrieval of the channel for obtaining the time data therefrom is to be performed automatically or manually. That is, after the user selects these menus, the time setting operation of the clock function is performed automatically.

Thus, for example, if the user suspends the operation, for any reason on the way of selecting the menu, for selecting whether the time setting operation is to be performed automatically or manually, there arises a problem that the time setting operation of the clock function is remained not being completed.

Incidentally, Japanese Patent Unexamined Publication No. Hei. 5-249256 discloses such a system that, when it is determined that the clock of a receiver such as a VCR is in an initial state, the clock of the receiver is automatically set on the basis of the time data contained in the television signal transmitted from a broadcast station.

Further, Japanese Patent Unexamined Publication No. Hei. 5-176035 discloses a button telephone device wherein the time signal service within the public line is automatically received at every constant time period, then the time data is discriminated from the audio signal contained in the received time signal, and the time of an internal clock is corrected on the basis of the discriminated time data.

SUMMARY OF THE INVENTION

The present invention has been made so as to obviate such conventional problems and an object of the present invention is to provide an automatic time setting apparatus for an electronic device which can perform the time setting operation automatically after the lapse of a constant time period even if a user does not perform any operation for the time setting, and to provide an automatic time setting method.

In order to achieve the above object, according to a first aspect of the invention, there is provided an automatic time setting apparatus for an electronic device which receives transmission radio wave in which time data is inserted, extracts the time data from the received transmission radio wave and performs a time setting operation of clock means within the electronic device in accordance with the extracted time data, the automatic time setting apparatus comprising: measuring means which starts measuring a constant time period in response to first turning-on of a power source; first determining means which determines whether or not a first time setting operation of the clock means has been performed; and time setting control means which executes the time setting operation when the measuring means has measured the constant time period, in a case where the first determining means determines that the first time setting operation has not been performed yet.

According to a second aspect of the invention, there is provided an automatic time setting method for a television receiver or a video cassette recorder containing a tuner which receives a transmission radio wave in which time data is inserted, extracts the time data from the received transmission radio wave and performs a time setting operation of clock means within the television receiver or the video cassette recorder in accordance with the extracted time data, the method comprising the steps of: determining, after a lapse of a predetermined time period after first turning-on of a power source, whether or not the time setting operation of the clock means has been performed; and executing automatically the time setting operation when it is determined that the time setting operation has not been performed yet.

According to a third aspect of the invention, there is provided an automatic time setting method for a television receiver or a video cassette recorder containing a tuner which receives a transmission radio wave in which time data is inserted, extracts the time data from the received transmission radio wave and performs a time setting operation of clock means within the television receiver or the video cassette recorder in accordance with the extracted time data, the method comprising the steps of: determining, after a lapse of a predetermined time period after first turning-on of a power source, whether or not the time setting operation of the clock means has been performed; and determining whether or not a television signal in which the time data is inserted is being received, wherein the automatic time setting operation is executed based on the time data when it is determined that the time setting operation has not been performed yet and that the television signal in which the time data is inserted is being received, and wherein when it is determined that the time setting operation has not been performed yet and that the television signal in which the time data is inserted is not being received, the automatic time setting operation is not executed and the two determining steps are executed again after lapse of a predetermined time period.

According to a fourth aspect of the invention, there is provided an automatic time setting method for a television receiver or a video cassette recorder containing a tuner which receives a transmission radio wave in which time data is inserted, extracts the time data from the received transmission radio wave and performs a time setting operation of clock means within the television receiver or the video cassette recorder in accordance with the extracted time data, the method comprising the steps of: determining, after a lapse of a predetermined time period after first turning-on of a power source, whether or not the time setting operation of the clock means has been performed; and determining whether or not a television signal in which the time data is inserted is being received, wherein the automatic time setting operation is executed based on the time data when it is determined that the time setting operation has not been performed yet and that the television signal in which the time data is inserted is being received, wherein when it is determined that the time setting operation has not been performed yet and that the television signal in which the time data is inserted is not being received, the automatic time setting operation is not executed and the two determining steps are executed again after lapse of a predetermined time period, and wherein the two determining steps are repeatedly executed upon every lapse of the predetermined time period until the automatic time setting operation is executed.

DETAILED DESCRIPTION OF THE PREFERRED EMBODIMENT

An embodiment of the present invention will be described with reference to the accompanying drawings.

Figure 1:
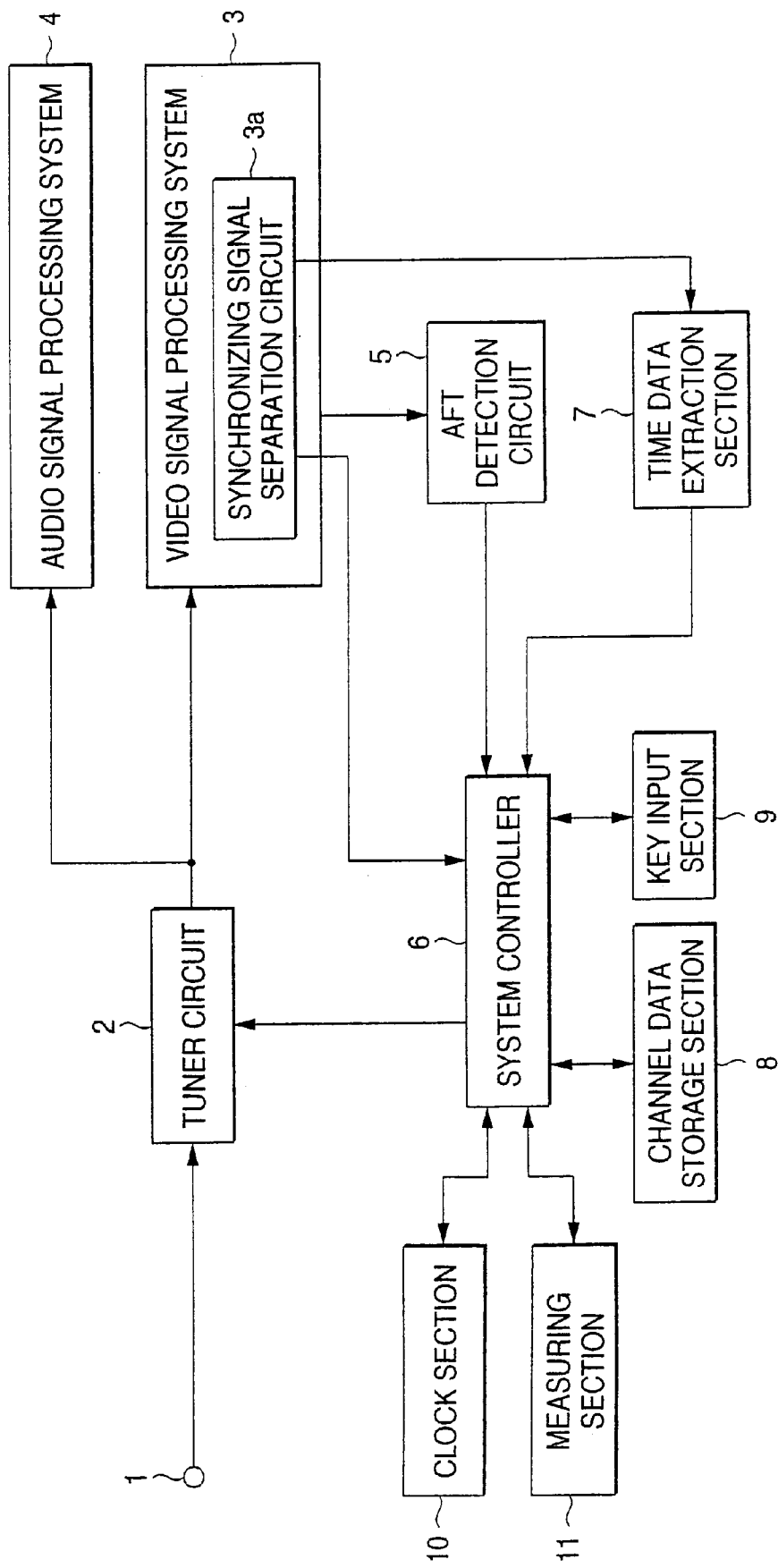
FIG. 1 is a block diagram showing the entire arrangement of a television receiver containing therein an automatic time setting apparatus according to the present invention.

FIG. 1 is a block diagram showing the entire arrangement of an electronic device containing therein an automatic time setting apparatus according to the present invention, in which case a television receiver is used as an example of the electronic device.

In the figure, an antenna input terminal 1 is connected to a tuner circuit 2 for selecting a desired channel from the received broadcasting waves. The output of the tuner circuit 2 is applied to a video signal processing system 3 for subjecting the video signal of the selected channel to detecting and amplifying operations or the like and to an audio signal processing system 4 for subjecting the audio signal of the selected channel to detecting and amplifying operations or the like.

An AFT voltage outputted from a not-shown detecting circuit of the video signal processing system 3 is applied to an AFT detection circuit 5. The detecting signal (AFT signal) from the AFT detection circuit 5 is applied to a system controller 6 for performing the channel selection control processing or the like. The synchronizing signal (SD signal) separated from the video signal by a synchronizing signal separation circuit 3a of the video signal processing system 3 is applied to the system controller 6. The time data contained in the video signal within the vertical blanking intervals is applied from the synchronizing signal separation circuit to a time data extraction section 7, which in turn extracts the time data and applies the time data thus extracted to the system controller 6.

The system controller 6 is bidirectionally connected to a channel data storage section 8 which is formed by an EEP-ROM or the like for storing frequency data of the respective channels and further connected to a key input section 9 having an automatic-preset key, a channel selection key and the like. Further, the system controller 6 is bidirectionally connected to a clock section 10 which counts the current time and also bidirectionally connected to a measuring section (timer section) 11 which measures (counts) arbitrary time. Furthermore, the system controller 6 is arranged in a manner that the output thereof is applied to the tuner circuit 2.

The system controller 6 determines, at the time where the measuring section 11 has measured a constant time period after the first turning-on of the power source, whether or not the clock section 10 has been subjected to the first time setting. If it is determined that the first time setting has not been performed yet, the system controller executes the first time setting operation of the clock section 10. Further, the system controller 6 determines, at the time where the measuring section 11 has measured a constant time period, whether or not the device itself is in a state ready for performing the time setting operation. If it is determined that the device itself is not in the state ready for performing the time setting operation, the system controller 6 resets the measuring section 11 thereby to have the measuring section start to measure a constant time period equal to or shorter than the first constant time period. Furthermore, the system controller 6 corrects, after executing the first time setting operation of the clock section 10, the set time at every lapse of a predetermine time period measured by the measuring section 11. That is, the first determining means, the second determining means, the measuring control means, the time setting control means and the time correcting control means recited in claims are realized by the system controller 6 in this embodiment.

Figure 2:
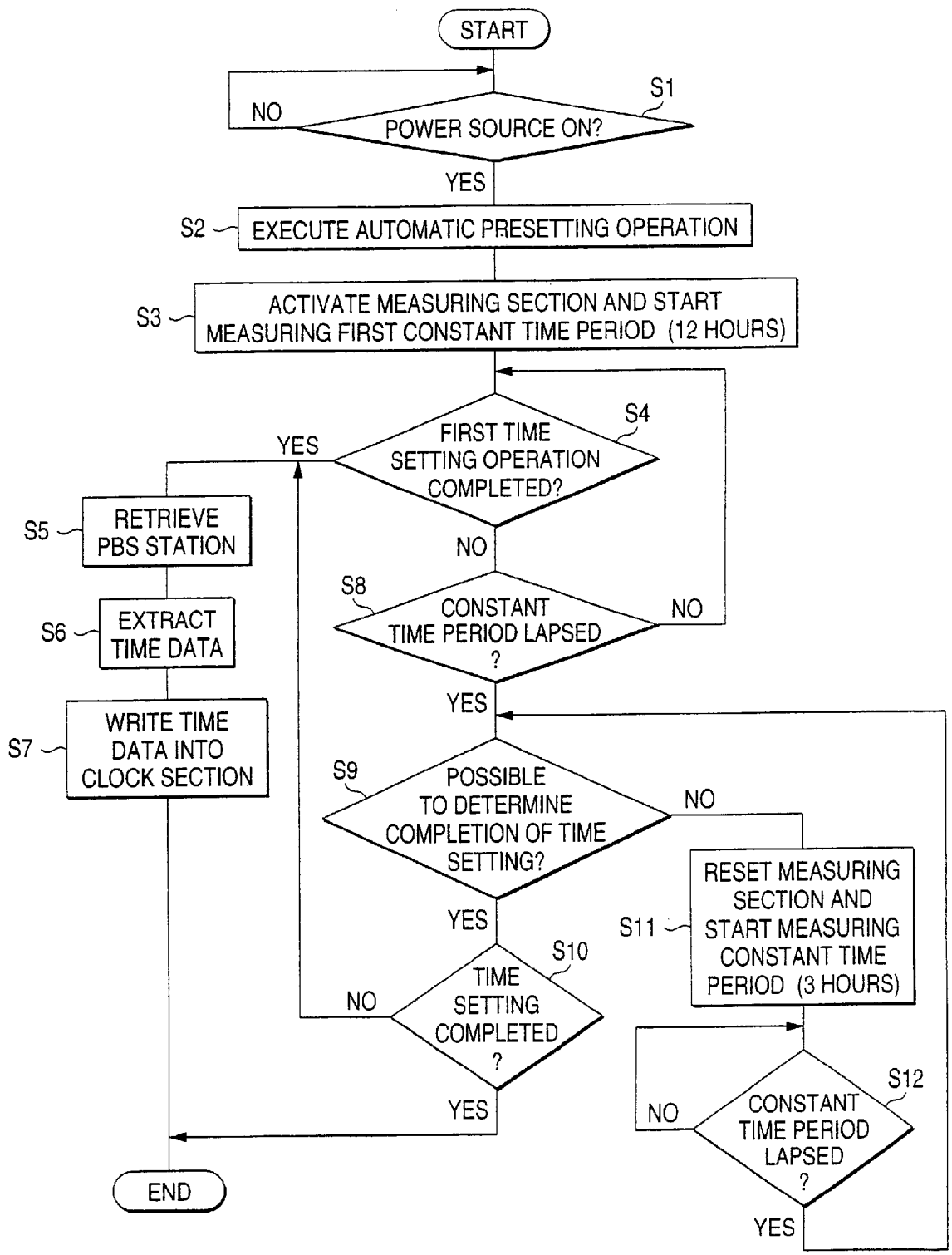
FIG. 2 is a flow chart for explaining the first time setting operation (initial setting operation) of a clock section in the television receiver containing therein the automatic time setting apparatus according to the present invention.

Then, in the television receiver containing the automatic time setting apparatus arranged in the above-described manner, the first time setting operation (initial setting operation) of the clock section 10 will be described with reference to the flow chart shown in FIG. 2.

When a user inserts a plug of the television receiver into a socket and first turns on a not-shown power switch of the key input section 9 (step S1), the system controller 6 at first executes the automatic presetting (channel presetting) operation (step S2) and activates the measuring section 11 to start measuring the first constant time period (for example, 12 hours) (step S3).

Since the automatic presetting operation of step S2 is the conventionally well known technique, the description thereof will be made simply hereinafter. That is, the system controller 6 controls a not-shown local oscillator of the tuner circuit 2 so as to change the respective bands of VHF (very high frequency) and UHF (ultra high frequency) thereby to scan all the channels of the respective bands from the lower frequency to the higher frequency. The system controller 6 receives the SD signal from the synchronizing signal separation circuit 3a of the video signal processing system 3 and the AFT signal from the AFT detection circuit 5. When the system controller 6 determines that both the SD signal and the AFT signal are received, the system controller stores the frequency data of the channel at this time into the channel data storage section 8. The system controller 6 performs such a presetting operation until the frequency scanning is performed to the maximum frequency for each of the respective bands, whereby the frequency data of all the channels of the broadcasting waves is stored in the channel data storage section 8.

When the automatic presetting operation is completed in this manner, then a selection menu for selecting whether the time setting operation is to be performed automatically or manually is displayed on the television screen. When the user selects the automatic time setting operation, then another selection menu is displayed for selecting whether a channel from which the time data is obtained is to be retrieved automatically or manually. When the user selects the automatic channel retrieval (that is, when it is determined to be Yes in step S4), hereinafter, the first time setting operation of the clock section 10 is performed automatically (steps S5 to S7). The operation of steps S5 to S7 will be described later.

On the other hand, when the user suspends the operation for any reason in either the state where the selection menu for selecting whether the time setting operation is to be performed automatically or manually is displayed or the state where the selection menu for selecting whether a channel from which the time data is obtained is to be retrieved automatically or manually is displayed, the first time setting operation of the clock section 10 is remained not being completed (that is, it is determined to be No in step S4). When the measuring section 11 measures the first constant time period in such a state that the time setting operation is remained not being completed (step S8), the system controller 6 determines whether or not the first time setting operation of the clock section 10 has been performed on the basis of the measurement signal from the measuring section 11 (steps S9 to S10). The determination in step S10 can be made on the basis of a time setting flag which is set when the time setting operation of the clock section 10 is performed, for example.

When it is determined that the time setting operation of the clock section 10 has not been performed, the first time setting operation of the clock section 10 is performed automatically at this time (steps S5 to S7). To be more concrete, the system controller 6 sequentially scans the preset channels on the basis of the channel data stored in the channel data storage section 8 to sequentially receive the television signals, and retrieves such a broadcasting station (PBS station) that the television signal received from which includes the time data inserted into the video signal portion thereof (step S5). The time data extraction section 7 extracts the time data inserted into the television signal transmitted from the broadcasting station thus retrieved and outputs the time data thus extracted to the system controller 6 (step S6) Then, the system controller 6 writes the time data into the clock section 10 thereby to complete the time setting operation of the clock section 10 (step S7).

When it is not impossible in step S9 to determine whether or not the time setting operation has been performed (for example, in a condition where the time data can not be obtained such that the user watches a program of a broadcasting station which transmits the television signal of the program in which no time data is contained), the process proceeds to step S11, in which the measuring section 11 is made reset and the time measurement of a constant time period is started. The constant time period at this time is set to be a time period, for example 3 hours, shorter than the first constant time period of 12 hours, for example. When the constant time period of 3hours has passed, the process returns from step S12 to step S9, and then the above-described processes are repeated again. The constant time period (3 hours) at the second and succeeding times is set to be shorter than the first constant time period (12 hours) so that the time setting operation of the clock section 10 can be completed within at least one day even if the operations from step S9 to step S11 are repeated for several times.

As described above, according to the automatic time setting apparatus for an electronic device of the present invention, so long as a user inserts the plug of the electronic device into the socket and turns on the power switch, thereafter, the time setting operation of the clock section 10 can be performed automatically upon the lapse of the constant time period even if the initial time setting operation of the clock section 10 is not executed due to the suspension of the user's operation or the like and further even if the user does not perform any operation.

Although in the above-described explanation of the time setting operation, the first constant time period is set to be 12 hours and the second constant time period shorter than the first constant time period is set to be 3 hours, these constant time periods may be set to arbitrary time periods. Further, although in the above-described explanation of the time setting operation, the condition for starting the measurement of the measuring section 11 is set to be at the timing where the user inserts the plug of the television receiver into the socket and turns on the power switch, the condition for starting the measurement of the measuring section 11 may be set to be at the timing where the user inserts the plug of the television receiver into the socket. Further, in the above-described explanation of the time setting operation, the measurement of the constant time period by the measuring section 11 is performed in a state where the automatic presetting operation has been already executed. However, in the case where the automatic presetting operation has not been executed yet when the constant time period has been measured by the measuring section 11, the processing of step S9 and the succeeding steps is executed after the execution of the automatic presetting operation.

Figure 3:
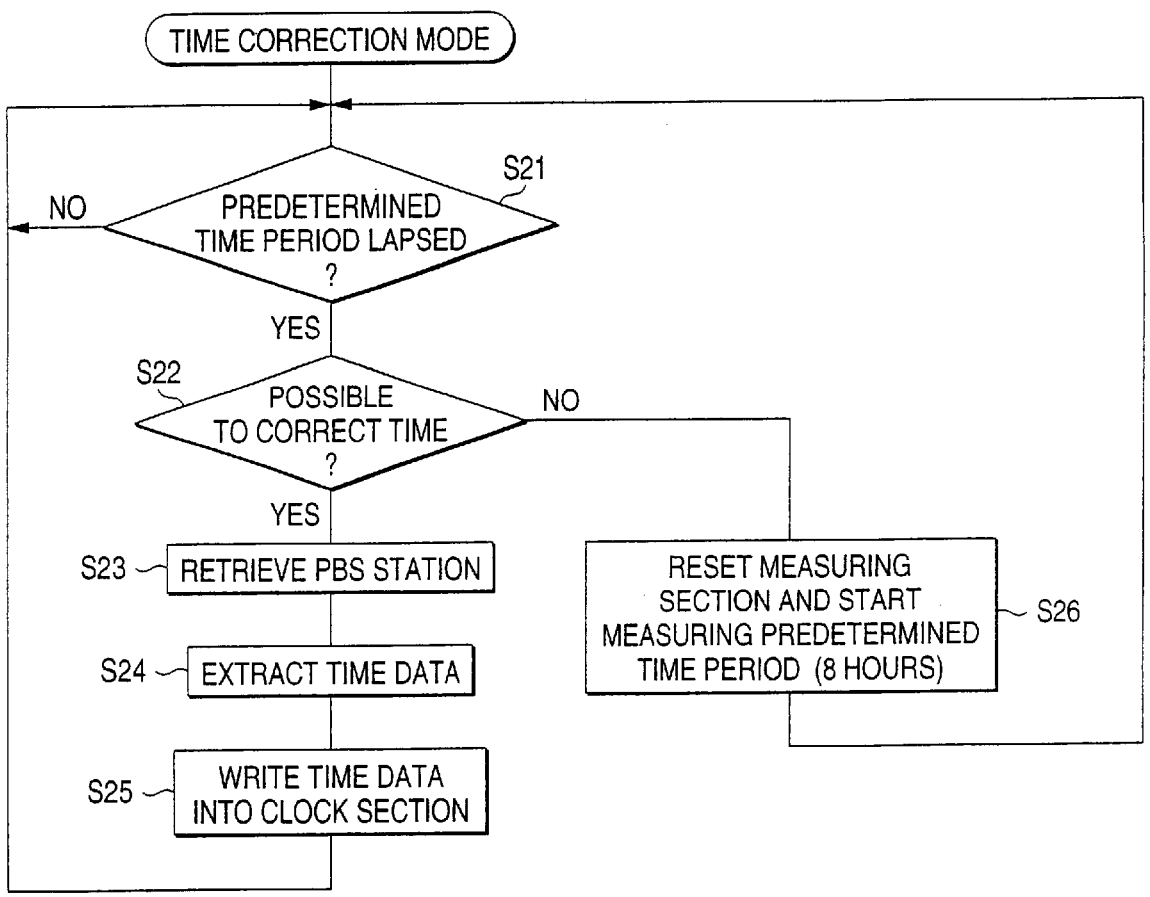
FIG. 3 is a flow chart for explaining the time correction operation of the clock section in the television receiver containing therein the automatic time setting apparatus according to the present invention.

Then, the time correction operation of the clock section 10 will be described with reference to the flow chart shown in FIG. 3.

Even if the clock section 10 is subjected to the time setting operation, if the television receiver is used for a long time without correcting the set time thereafter, there appears a difference between the time of the clock section and the actual time. Thus, in the present embodiment, the time correction operation is performed by using the measuring section 11 provided in the embodiment.

To be more concrete, when the first time setting operation of the clock section 10 is completed, the system controller 6 resets the measuring section 11 thereby to start measuring a predetermined time period. Although the predetermined time period in this case can be set to an arbitrary time period, it is set to be 8 hours, for example, in this embodiment. When the measuring section 11 has measured the predetermined time period (8 hours) (step S21), the system controller 6 determines whether or not it is possible to correct the time (step S22). In this case, if the time data can not be obtained due to such a reason that the user watches a program of a broadcasting station which transmits the television signal of the program in which no time data is contained, the process proceeds to step S26, in which the measuring section 11 is reset and the measurement of the predetermined time period (8 hours) is started again (step S21). When the measuring section 11 measures 8 hours, it is determined again whether or not it is possible to correct the time (step S22).

If it is determined that it is possible to correct the time in step S22 (for example, in a case where the power switch is turned off, or the user watches a program of a broadcasting station which transmits the television signal of the program in which the time data is contained), the time correction of the clock section 10 is performed (steps S23 to S25). To be more-concrete, the system controller 6 sequentially scans the preset channels on the basis of the channel data stored in the channel data storage section 8 to sequentially receive the television signals, and retrieves such a broadcasting station (PBS station) that the television signal received from which includes the time data inserted into the video signal portion thereof (step S23). The time data extraction section 7 extracts the time data inserted into the television signal transmitted from the broadcasting station thus retrieved and outputs the time data thus extracted to the system controller 6 (step S24). Then, the system controller 6 writes the time data into the clock section 10 thereby to correct the time of the clock section 10 (step S25).

If it is determined that it is possible to correct the time in step S22, in a case where the user watches a program of a broadcasting station which transmits the television signal of the program in which the time data is contained, the retrieval process in step S23 is skipped and the time data inserted into the video signal portion of the television signal of the broadcasting station being received is extracted.

The time correction operation may be performed in various manners such that it is executed in a state where the power switch is turned off or the like.

Although in the above-described embodiment, a television receiver is used as an example of the electronic device, a video cassette recorder containing a tuner or the like may be used.

In the automatic time setting apparatus or method according to the invention, so long as a user performs the operation for supplying a power to the device, thereafter, the time setting operation of the clock section can be performed automatically after the lapse of the constant time period even if the initial time setting operation of the clock section is not executed due to the suspension of the user's operation or the like and further even if the user does not perform any operation.

What is claimed is:

1. An automatic time setting apparatus for an electronic device which receives transmission radio wave in which time data is inserted, extracts the time data from the received transmission radio wave and performs a time setting operation of clock means within the electronic device in accordance with the extracted time data, said automatic time setting apparatus comprising:

measuring means which starts measuring a constant time period in response to first turning-on of a power source;

first determining means which determines whether or not a first time setting operating of said clock means has been performed; and time setting control means which executes the time setting operating when said measuring means has measured the constant time period, in a case where said first determining means determines that the first time setting operation has not been performed yet.

2. The automatic time setting apparatus according to claim 1, further comprising:

second determining means which determines, when said measuring means has measured the constant time period, whether or not the electronic device is in a state ready for starting the time setting operation; and measuring control means which resets said measuring means, when said second determining means determines that the electronic device is not in the state ready for starting the time setting operation, and starts measuring a second constant time period equal to or shorter than the first constant time period.

3. The automatic time setting apparatus according to claim 1, further comprising:

time correction control means which corrects, after the execution of the first time setting operation, the set time at every lapse of a predetermined time period measured by said measuring means.

4. The automatic time setting apparatus according to claim 1, wherein:

said measuring means starts measuring the first constant time period when at least one of a plug of the electronic device is inserted into a socket and when the plug of the electronic device is inserted into the socket and a power switch is turned on.

5. The automatic time setting apparatus according to claim 1, wherein the transmission radio wave is a television signal in which the time data is inserted into a video signal portion thereof.

6. The automatic time setting apparatus according to claim 1, wherein:

in a case where at least one of a channel presetting operation is not performed and a broadcasting station transmitting a television signal containing time data is not detected at a time when said measuring means has measured the constant time period;

said time setting control means at least executes an automatic presetting operation thereby to set frequency data of broadcasting stations to respective channels, retrieves the broadcasting station transmitting the television signal in which the time data is inserted among the broadcasting stations thus set, extracts the time data inserted in the television signal transmitted from the broadcasting station thus retrieved and performs the time setting operation of said clock means.

7. An automatic time setting method for a television receiver or a video cassette recorder containing a tuner which receives a transmission radio wave in which time data is inserted, extracts the time data from the received transmission radio wave and performs a time setting operating of clock means within the television receiver or the video cassette recorder in accordance with the extracted time data, said method comprising the steps of:

determining, after a lapse of a predetermined time period after first turning-on of a power source, whether or not the time setting operation of said clock means has been performed; and executing automatically the time setting operation when it is determined that the time setting operation has not been performed yet.

8. An automatic time setting method for a television receiver or a video cassette recorder containing a tuner which receives a transmission radio wave in which time data is inserted, extracts the time data from the received transmission radio wave and performs a time setting operation of clock means within the television receiver or the video cassette recorder in accordance with the extracted time data, said method comprising the steps of:

determining, after a lapse of a predetermined time period after first turning-on of a power source, whether or not the time setting operation of said clock means has been performed; and determining whether or not a television signal in which the time data is inserted is being received, wherein the automatic time setting operation is executed based on the time data when it is determined that the time setting operation has not been performed yet and that the television signal in which the time data is inserted is being received, and wherein when it is determined that the time setting operation has not been performed yet and that the television signal in which the time data is inserted is not being received, the automatic time setting operation is not executed and said two determining steps are executed again after lapse of a predetermined time period.

9. An automatic time setting method for a television receiver or a video cassette recorder containing a tuner which receives a transmission radio wave in which time date is inserted, extracts the time data from the received transmission radio wave and performs a time setting operation of a clock means within the television receiver or the video cassette recorder in accordance with the extracted time data, said method comprising the steps of:

determining, after a lapse of a predetermined time period after first turning-on of a power source, whether or not the time setting operation of said clock means has been performed; and determining whether or not a television signal in which the time data is inserted is being received, wherein the automatic time setting operation is executed based on the time data when it is determined that the time setting operation has not been performed yet and that the television signal in which the time data is inserted is being received, wherein when it is determined that the time setting operation has not been performed yet and that the television signal in which the time data is inserted is not being received, the automatic time setting operation is not executed and said two determining steps are executed again after lapse of a predetermined time period, and wherein said two determining steps are repeatedly executed upon every lapse of the predetermined time period until the automatic time setting operation is executed.

10. An automatic time setting apparatus for an electronic device which receives transmission radio wave in which time data is inserted, extracts the time data from the received transmission radio wave and performs a time setting operation of clock means within the electronic device in accordance with the extracted time data, said automatic time setting apparatus comprising:

measuring means which starts measuring a constant time period in response to first connection to a power source:

first determining means which determines whether or not a first time setting operating of said clock means has been performed;

time setting control means which executes the time setting operating when said measuring means has measured the constant time period, in a case where said first determining means determines that the first time setting operation has not been performed yet;

second determining means which determines, when said measuring means has measured the constant time period, whether or not the electronic device is in a state ready for starting the time setting operation; and measuring control means which resets said measuring means, when said second determining means determines that the electronic device is not in the state ready for starting the time setting operation, and starts measuring a second constant time period equal to or shorter than the first constant time period.

11. An automatic time setting apparatus for an electronic device which receives transmission radio wave in which time data is inserted, extracts the time data from the received transmission radio wave and performs a time setting operation of clock means within the electronic device in accordance with the extracted time data, said automatic time setting apparatus comprising:

measuring means which starts measuring a constant time period in response to first connection to of a power source;

first determining means which determines whether or not a first time setting operating of said clock means has been performed;

time setting control means which executes the time setting operating when said measuring means has measured the constant time period, in a case where said first determining means determines that the first time setting operation has not been performed yet;

said measuring means starts measuring the first constant time period when at least one of a plug of the electronic device is inserted into a socket and when the plug of the electronic device is inserted into the socket and a power switch is turned on;

said transmission radio wave being a television signal in which the time data is inserted into a video signal portion thereof;

in a case where at least one of a channel presetting operation is not performed and a broadcasting station transmitting a television signal containing time data is not detected at a time when said measuring means has measured the constant time period; and said time setting control means at least executes an automatic presetting operation thereby to set frequency data of broadcasting stations to respective channels, retrieves the broadcasting station transmitting the television signal in which the time data is inserted among the broadcasting stations thus set, extracts the time data inserted in the television signal transmitted from the broadcasting station thus retrieved and performs the time setting operation of said clock means.

* * * * *